United States Patent [19]
Watanabe

[11] Patent Number: 5,433,135
[45] Date of Patent: Jul. 18, 1995

[54] VARIABLE PRESSURE PASSAGE FOR A BOOSTER

[75] Inventor: Makoto Watanabe, Saitama, Japan

[73] Assignee: Jidosha Kiki Co., Ltd., Tokyo, Japan

[21] Appl. No.: 309,860

[22] Filed: Sep. 21, 1994

[30] Foreign Application Priority Data

Oct. 29, 1993 [JP] Japan ................................ 5-294455

[51] Int. Cl.⁶ .............................................. F15B 9/10
[52] U.S. Cl. ............................................... 91/376 R
[58] Field of Search ................ 91/369.2, 369.3, 376 R

[56] References Cited

U.S. PATENT DOCUMENTS

| | | |
|---|---|---|
| 4,398,449 | 8/1983 | Takayama et al. ........... 91/369.3 |
| 4,587,884 | 5/1986 | Tsubouchi ................... 91/376 R |
| 4,619,185 | 10/1986 | Mori et al. . |
| 4,658,704 | 4/1987 | Mori et al. ................... 91/376 R |
| 4,700,733 | 10/1987 | Uchino et al. . |
| 4,718,328 | 1/1988 | Mori et al. . |
| 4,759,255 | 7/1988 | Shimamura . |
| 4,787,292 | 11/1988 | Tsuyuki et al. . |
| 4,793,242 | 12/1988 | Kobayashi . |
| 4,846,047 | 7/1989 | Uyama et al. . |
| 4,936,195 | 6/1990 | Uyama . |
| 4,976,188 | 12/1990 | Suzuki et al. . |
| 5,027,695 | 7/1991 | Inoue et al. . |
| 5,083,497 | 1/1992 | Araki et al. . |
| 5,111,734 | 5/1992 | Suzuki . |
| 5,121,674 | 6/1992 | Uyama . |
| 5,228,377 | 7/1993 | Watanabe . |
| 5,287,793 | 2/1994 | Satoh et al. . |

*Primary Examiner*—F. Daniel Lopez
*Attorney, Agent, or Firm*—Flynn, Thiel, Boutell & Tanis

[57] ABSTRACT

An improvement of a variable pressure passage formed in a valve body of a booster to provide a communication between a valve mechanism and a variable pressure chamber is disclosed. The variable pressure passage comprises a pair of radial bores formed in the valve body and a plurality of axial grooves which provide a communication between the radial bores. This secures a sufficient channel area for the variable pressure passage, which then includes a plurality of flow paths. Accordingly, sound which is produced upon actuation of the booster as the atmosphere flows through the variable pressure passage can be reduced without degrading the response of the booster upon actuation.

3 Claims, 5 Drawing Sheets

VARIABLE PRESSURE PASSAGE FOR A BOOSTER

FIELD OF THE INVENTION

The invention relates to a booster, and more particularly, to an improvement of a variable pressure passage formed in a valve body to provide a communication between a valve mechanism and a variable pressure chamber.

DESCRIPTION OF THE PRIOR ART

A booster is known in the art comprising a substantially cylindrical valve body which is slidably disposed within a shell, a constant and a variable pressure chamber defined across a power piston mounted on the valve body, a valve mechanism received within the valve body for switching a fluid circuit, a constant pressure passage formed axially in the valve body to provide a communication between the constant pressure chamber and the valve mechanism, a variable pressure passage formed in the valve body to provide a communication between the valve mechanism and the variable pressure chamber, a pressure passage formed in the valve body to provide a communication between the valve mechanism and a source of pressure fluid, a valve plunger forming part of the valve mechanism and slidably fitted in the valve body, a guide formed on the inner peripheral surface of the valve body to guide the valve plunger for sliding movement, a first radial bore formed radially within the valve body at a location forwardly of the guide and a key member movably engaged in the first radial bore, and a second radial bore formed radially in the valve body at a location rearward of the guide and defining the variable pressure passage.

In the booster described above, the second radial bore formed in the valve body to define the variable pressure passage assures a sufficient channel area, but because the variable pressure passage is formed radially in the valve body, the atmosphere acting as a pressure fluid is introduced into the variable pressure chamber through a serpentine flow path. This disadvantageously increases the sound produced when the booster is operated as the atmosphere is introduced into the variable pressure chamber through the variable pressure passage.

A proposal has been made in the prior art to define a variable pressure passage comprising the first radial bore and an axial groove formed in the guide instead of using the second radial bore as the variable pressure passage. In this instance, even though the sound produced as the atmosphere flows past is reduced, the reduced channel area of the variable pressure passage degrades the operating response of the booster, which is clearly a disadvantage.

SUMMARY OF THE INVENTION

In view of the foregoing, in a booster including a substantially cylindrical valve body slidably disposed within a shell, a constant and a variable pressure chamber defined across a power piston mounted on the valve body, a valve mechanism received within the valve body for switching a fluid circuit, a constant pressure passage formed axially in the valve body to provide a communication between the constant pressure chamber and the valve mechanism, a variable pressure passage formed in the valve body to provide a communication between the valve mechanism and the variable pressure chamber, a pressure passage formed in the valve body to provide a communication between the valve mechanism and a source of pressure fluid, a valve plunger forming part of the valve mechanism and slidably fitted in the valve body, a guide formed on the inner peripheral surface of the valve body to guide the valve plunger for sliding movement, a first radial bore formed radially in the valve body at a location forwardly of the guide and rockably engaged by a key member, and a second radial bore formed radially in the valve body at a location rearward of the guide and defining the variable pressure passage, in accordance with the invention, at least one of the guide or the outer peripheral portion of the valve plunger which is disposed in sliding contact with the guide is formed with an axial groove which provides a communication between the first and the second radial bore, with a combination of the first and the second radial bore and the groove defining the variable pressure passage.

With this arrangement, a sufficient channel area can be secured for the variable pressure passage, and the variable pressure passage may be formed by a plurality of flow paths. In this manner, the sound produced as the pressure fluid flows through the variable pressure passage can be reduced without degrading the response of the booster upon actuation.

Above and other objects, features and advantages of the invention will become apparent from the following description of several embodiments thereof with reference to the drawings.

DETAILED DESCRIPTION OF EMBODIMENTS

Figure 1:
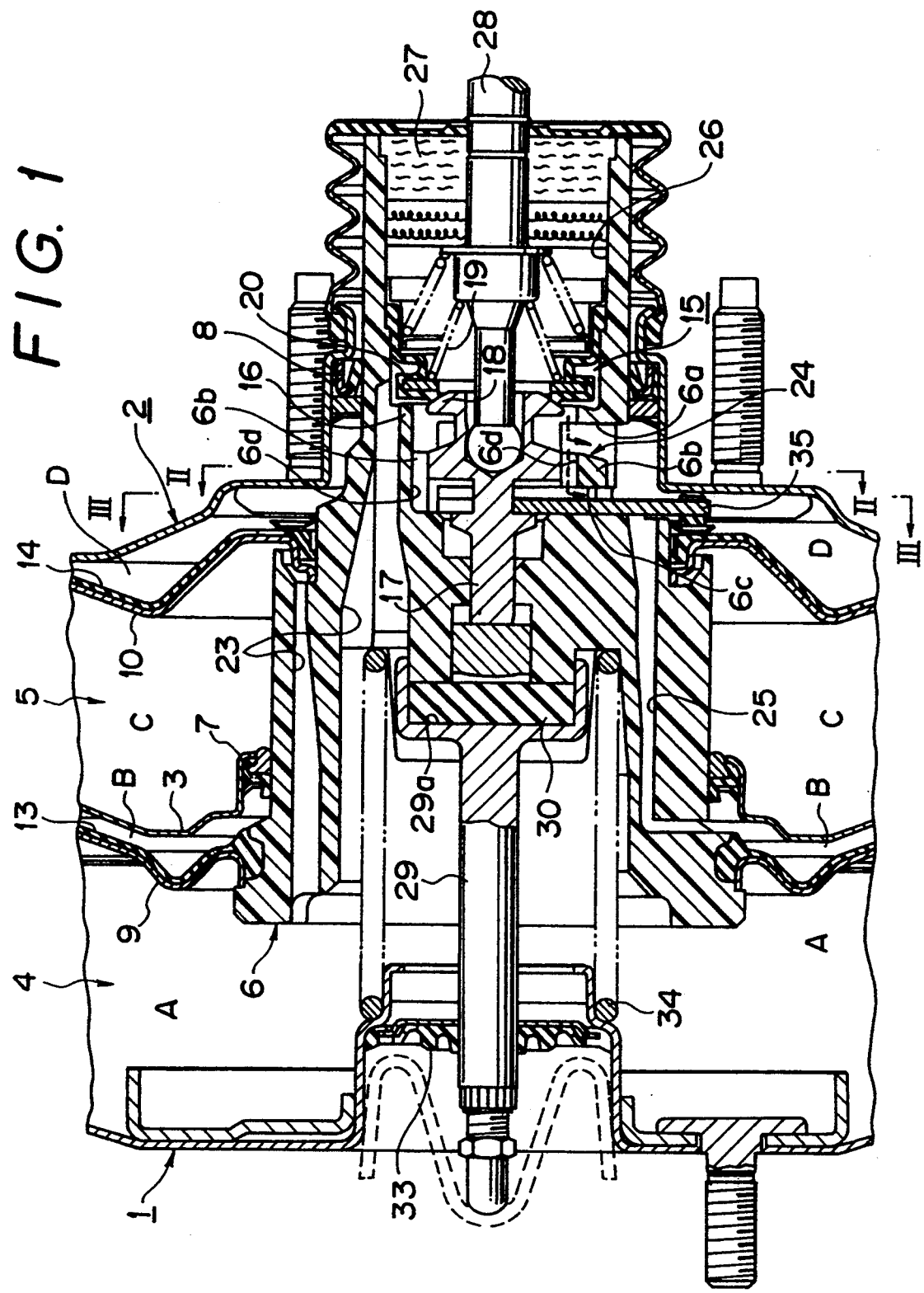
FIG. 1 is a cross section of one embodiment of the invention.

Referring to the drawings, several embodiments of the invention will now be described. Referring to FIG. 1, a front shell 1 and a rear shell 2 constitute together an enclosed vessel, in which a center plate 3 is centrally disposed to divide the interior into a pair of front and rear chambers 4, 5. A substantially cylindrical valve body 6 slidably extends through axial portions of the rear shell 2 and the center plate 3, with a hermetic seal therebetween being provided by annular seal members 7, 8, respectively.

A front and a rear power piston 9, 10, which are disposed in the front and the rear chamber 4, 5, respectively, are connected to the valve body 6, and a front and a rear diaphragm 13, 14 are applied to the back surfaces of the power pistons 9, 10, respectively, thus defining a constant pressure chamber A and a variable pressure chamber B across the front diaphragm 13, and defining a constant pressure chamber C and a variable pressure chamber D across the rear diaphragm 14.

A valve mechanism 15, which is in itself well known in the art, is disposed within the valve body 6 for switching a fluid circuit between the pair of constant pressure chambers A, C and the pair of variable pressure chambers B, D. Specifically, the valve mechanism 15 comprises an annular, first valve seat 16 formed on the valve body 6, a second valve seat 18 located radially inward of the annular first valve seat 16 and formed on a valve plunger 17 which is slidably fitted in the valve body 6, and a valve element 20 which is forwardly urged by a spring 19 to be seated upon either valve seat 16, 18.

A space radially outward of an annular seat defined by the contact between the first valve seat 16 and the valve element 20 communicates with the constant pressure chambers A, C through a constant pressure passage 23 formed axially in the valve body 6, and the constant pressure chamber A communicates with an intake manifold through a negative pressure introducing tube, not shown, which is mounted on the front shell 1.

A space radially inward of an annular seat defined by the contact between the first valve seat 16 and the valve element 20 and radially outward of an annular seat defined by the contact between the second valve seat 18 and the valve element 20, or a space located intermediate the both annular seats communicates with the variable pressure chamber D through a first variable pressure passage 24 which comprises a radial bore 6a formed in the valve body 6, and the variable pressure chamber D communicates with the variable pressure chamber B through a second variable pressure passage 25 formed in the valve body 6.

Finally, a space radially inward of the inner, annular seat defined by the contact between the second valve seat 18 and the valve element 20 communicates with the atmosphere through an atmosphere passage 26 formed in the valve body 6 and a filter 27 disposed therein.

The valve plunger 17 is guided for axial sliding movement by a guide 6b which is formed by the inner peripheral surface of the valve body 6 in a region adjacent to the radial bore 6a, and the right end thereof is connected to an input shaft 28 which is mechanically coupled to a brake pedal, not shown. On the other hand, the left end of the valve plunger 17 is disposed in opposing relationship with the right end face of a reaction disc 30 received in a recess 29a of a push rod 29.

The left end of the push rod 29 slidably extends through a seal member 33 and the axial portion of the front shell 1 to the outside thereof for connection with the piston of a master cylinder, not shown. The valve body 6 is normally maintained in its inoperative position shown by a return spring 34.

A radial bore 6c is formed in the valve body 6 adjacent to and forwardly of the guide 6b, and a key member 35 is movably inserted into the radial bore 6c to be engaged with the valve plunger 17, thereby preventing the valve plunger 17 from being disengaged from the valve body 6. The axial size of the radial bore 6c is chosen to be on the order of about twice the thickness of the key member 35, whereby the key member 35 is axially displaceable through a small stroke with respect to each of the valve body 6 and the valve plunger 17.

In the inoperative condition of the booster, the members such as the valve body 6 or the like are urged in the rearward direction by the return spring 34, whereby the key member 35 comes to a stop at a location where it abuts against the inner wall surface of the rear shell 2 as shown in FIG. 1. Under this inoperative condition, the key member 35 maintains the valve plunger 17 at a location advanced with respect to the valve body 6 to bring the valve element 20 close to the first valve seat 16, so that upon depression of the brake pedal to drive the input shaft 28 and the valve plunger 17 forward, a switching operation of the fluid circuit by the valve mechanism 15 occurs immediately.

The described arrangement and the operation thereof basically remain unchanged from a conventional known booster.

Figure 2:
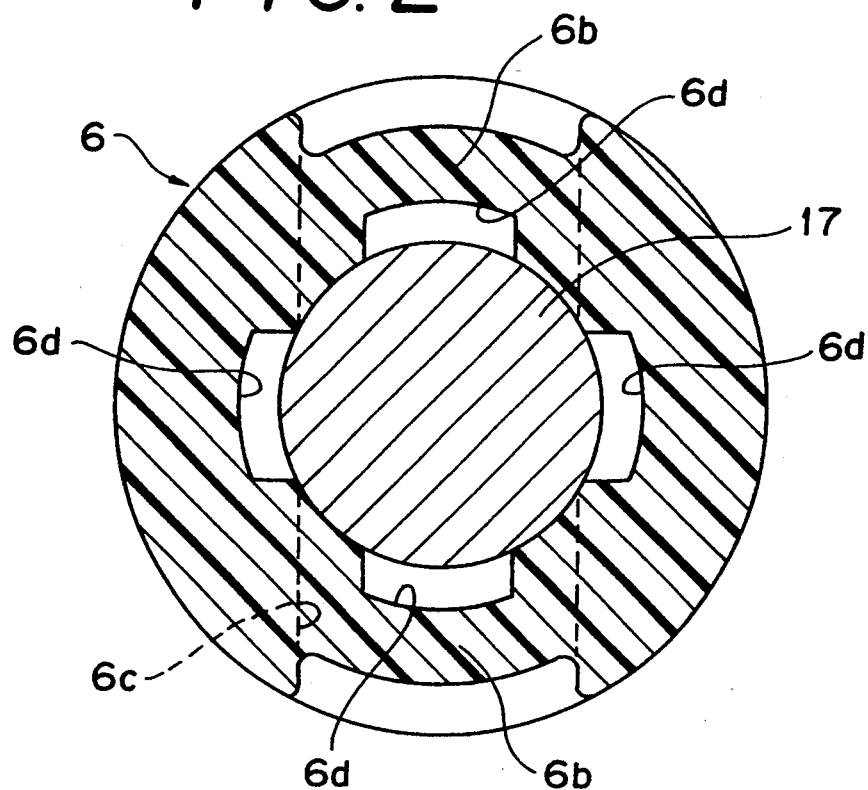
FIG. 2 is a cross section of part shown in FIG. 1 taken along the line II—II shown in FIG. 1.
Figure 3:
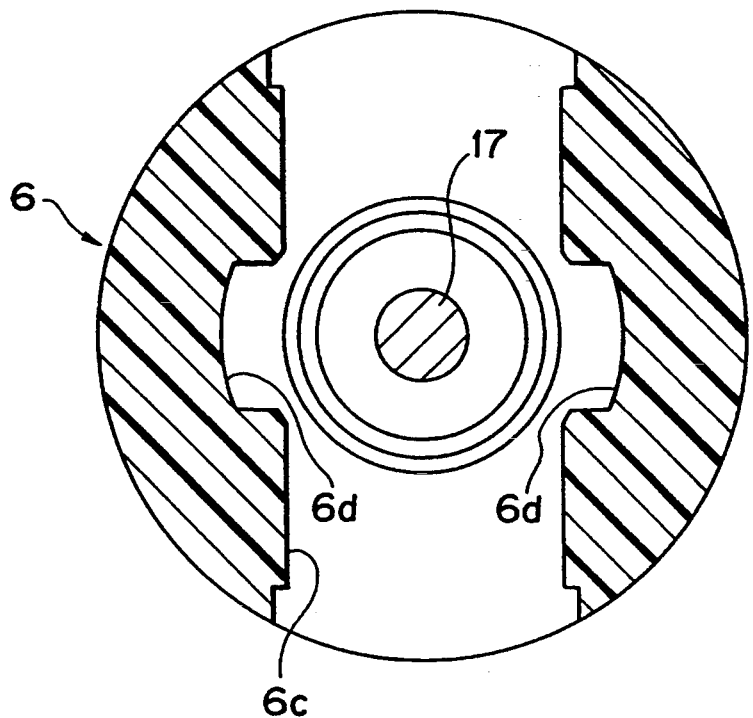
FIG. 3 is a cross section of part shown in FIG. 1 taken along the line III—III shown in FIG. 1.

As shown in FIGS. 2 and 3, four axial grooves 6d are formed around the circumference of the guide 6b at an equal interval and serve providing a communication between the radial bores 6a and 6c formed forwardly and rearwardly of the guide 6b. The first variable pressure passage 24 is constituted, not only by the radial bore 6a, but also by the radial bore 6c and the individual grooves 6d.

As a result of constructing the first variable pressure passage 24 in this manner, a sufficient channel area of the first variable pressure passage is secured in the present embodiment, and the first variable pressure passage 24 includes not only a path provided by the radial bore 6a, but also a path formed by the radial bore 6c in combination with the grooves 6d.

Accordingly, upon actuation of the booster, the atmosphere is rapidly introduced into the variable pressure chamber D through the first variable pressure passage 24, thus enabling a good response of the booster upon actuation. Since the atmosphere which flows through the first variable pressure passage 24 enters the variable pressure chamber D by passing through the pair of flow paths shown in broken lines in FIG. 1, the sound which is produced by a flow of the atmosphere can be reduced.

Second and Third Embodiments

Figure 4:
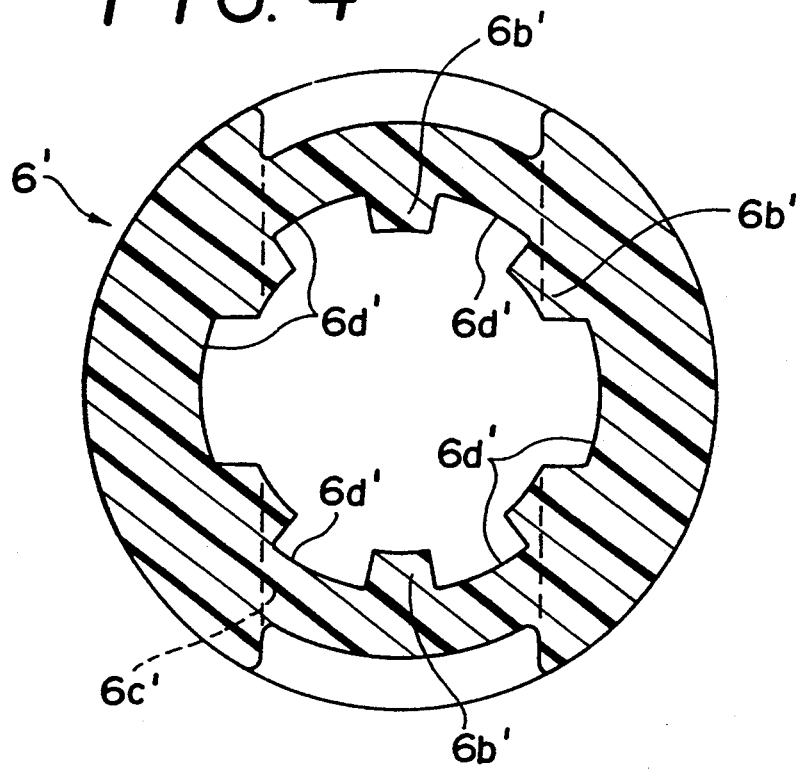
FIG. 4 is a cross section of part of a second embodiment of the invention.
Figure 5:
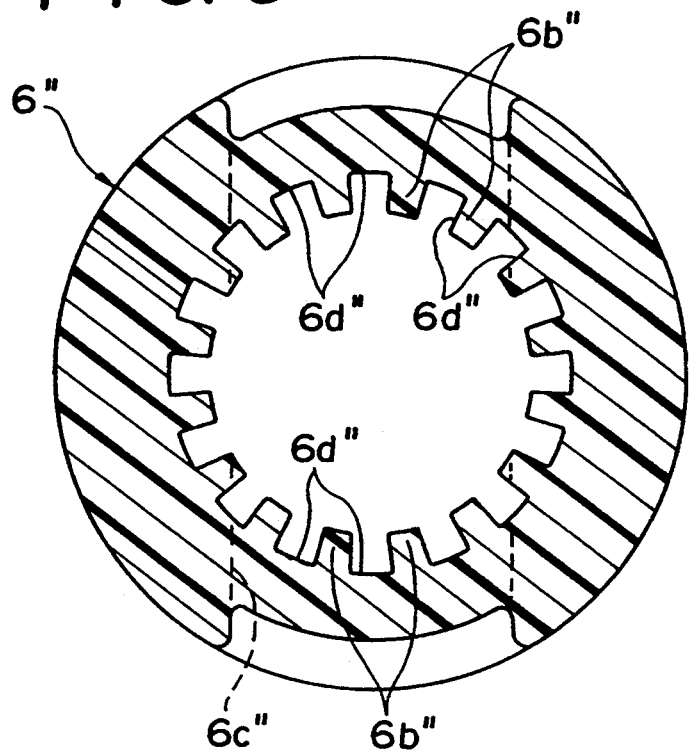
FIG. 5 is a cross section of part of a third embodiment of the invention.

FIGS. 4 and 5 show a second and a third embodiment of the invention. In the second embodiment shown in FIG. 4, a guide 6b' is formed with six axial grooves 6d' which are circumferentially spaced apart. In the third embodiment shown in FIG. 5, a guide 6b'' is formed with sixteen axial grooves 6d'' which are circumferentially spaced apart.

Figure 6:
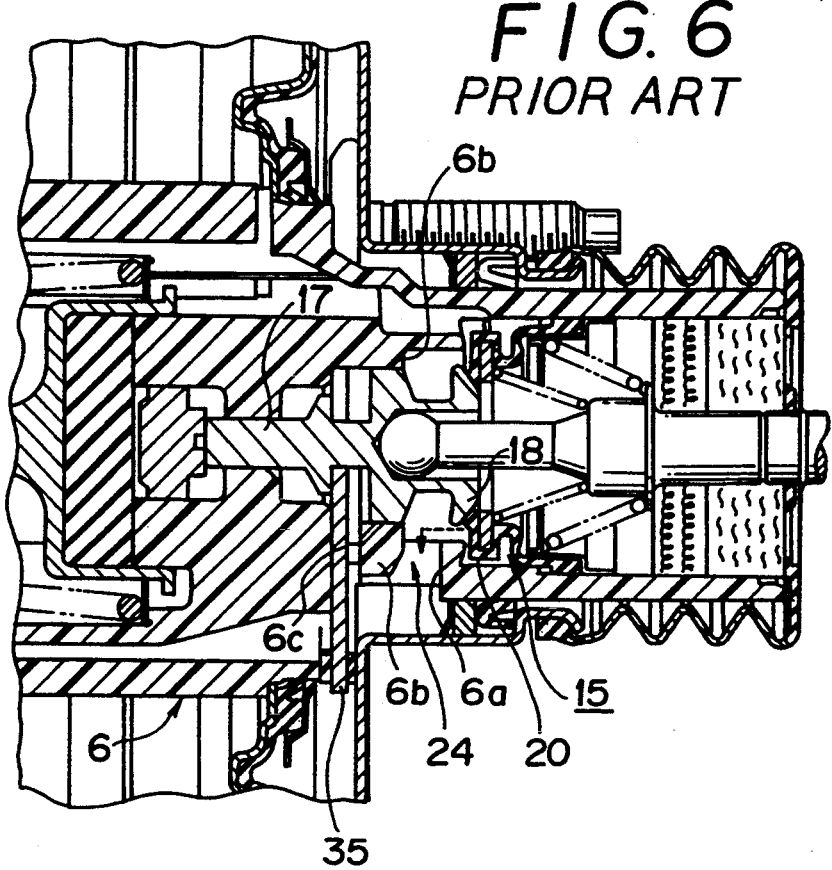
FIG. 6 is a cross section illustrating the prior art.

It will be noted that in contrast to these embodiments of the invention, the conventional booster as illustrated in FIG. 6 is not provided with a plurality of grooves 6d as formed in the guide 6b according to the invention, and accordingly the first variable pressure passage 24 is formed only by the radial bore 6a which is located rearward of the guide 6b.

With such prior art, a sufficient channel area can be secured for the first variable pressure passage 24 since it is possible to secure an increased width of the radial bore 6a. However, because the first variable pressure passage 24 is formed only by the radial bore 6a, as the atmosphere is introduced into the variable pressure chamber through the first variable pressure passage 24, the atmosphere will flow through the single path in a staggering manner, which disadvantageously results in producing a sound of an increased magnitude upon actuation.

Figure 7:
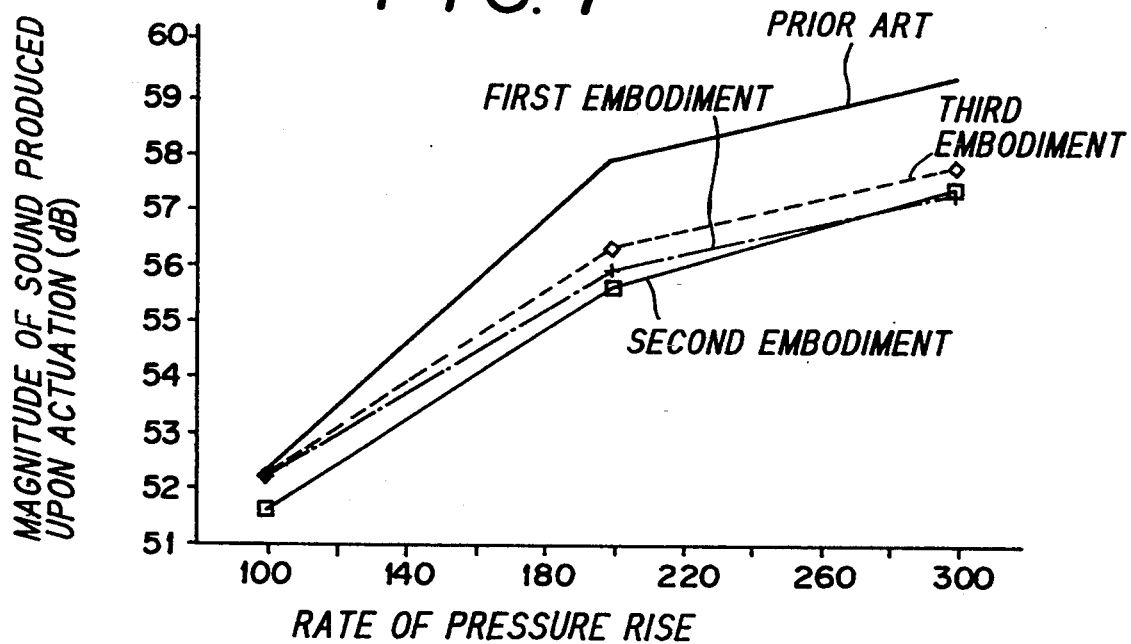
FIG. 7 graphically compares the magnitude of sound produced upon actuation between respective embodiments of the invention and the prior art shown in FIG. 6.

FIG. 7 graphically shows the magnitude of sound produced when the atmosphere flows through the first variable pressure passage 24 as a comparison of the embodiments of the invention against the prior art illustrated by FIG. 6. It will be noted from such experimental results that in the embodiments of the invention, the magnitude of sound produced is by 1.5 to 2 dB less than that produced by the prior art. The abscissa in FIG. 7 represents the rate of pressure rise when introducing the atmosphere into the variable pressure chamber D.

Figure 8:
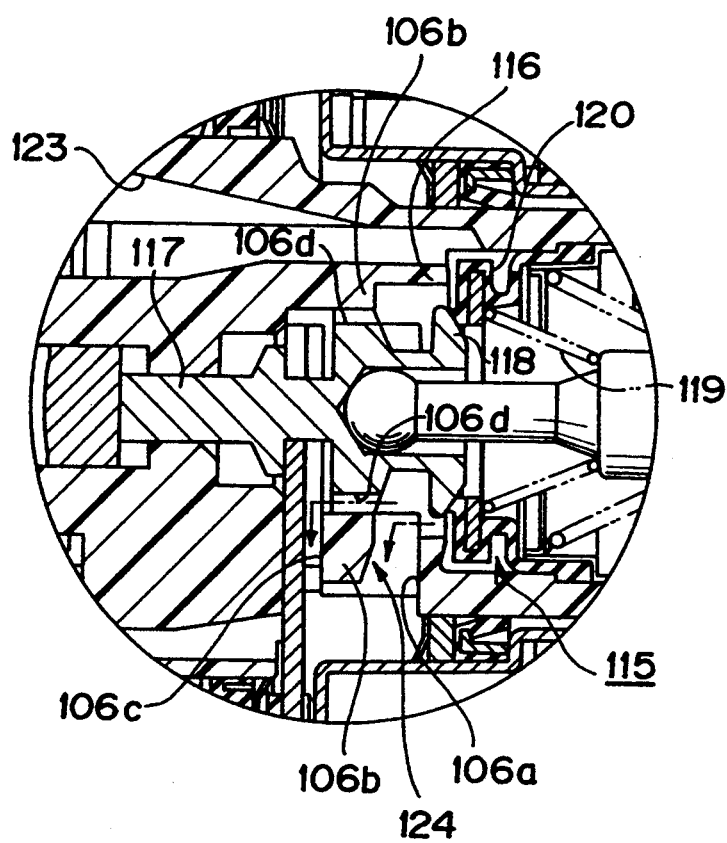
FIG. 8 is a cross section showing a further embodiment of the invention.

In the described embodiments, the grooves $6d$ ($6d'$, $6d''$) are formed in the guide $6b$ ($6b'$, $6b''$) on the valve body 6 ($6'$, $6''$), but grooves $106d$ may be formed in the outer peripheral surface of a valve plunger 117 which is in sliding contact with a guide $106b$, as shown in FIG. 8.

While the invention has been described above as applied to a brake booster of tandem type, it should be understood that the invention is equally applicable to a brake booster of single type or even a triple type having three pairs of constant and variable pressure chambers within an enclosed vessel.

While the invention has been illustrated and described above in connection with the several embodiments thereof, it should be understood that a number of changes, modifications and substitutions therein will readily occur to one skilled in the art from the above disclosure without departing from the spirit and scope of the invention defined by the appended claims.

What is claimed is:

1. A booster including a substantially cylindrical valve body slidably disposed within a shell, a constant and a variable pressure chamber formed across a power piston mounted on the valve body, a valve mechanism received within the valve body for switching a fluid circuit, a constant pressure passage formed axially in the valve body to provide a communication between the constant pressure chamber and the valve mechanism, a variable pressure passage formed in the valve body to provide a communication between the valve mechanism and the variable pressure chamber, a pressure passage formed in the valve body to provide a communication between the valve mechanism and a source of pressure fluid, a valve plunger forming part of the valve mechanism and slidably fitted in the valve body, a guide formed on the inner peripheral surface of the valve body for guiding the valve plunger for sliding movement, a first radial bore formed radially in the valve body at a location forwardly of the guide and a key member movably engaged in the first radial bore, and a second radial bore formed radially in the valve body at a location rearward of the guide to define the variable pressure passage;

characterized in that at least one of the guide or the outer peripheral portion of the valve plunger which is in sliding contact with the guide is formed with an axial groove which provides a communication between the first and the second radial bore, the combination of the first and the second radial bore and the groove constituting together the variable pressure passage.

2. A booster according to claim 1 in which the first radial bore has an axial size which is chosen to be on the order of about twice the thickness of the key member, there being a plurality of said axial grooves formed in the guide and spaced apart circumferentially thereof to define the variable pressure passage.

3. A booster according to claim 1 in which the first radial bore has an axial size which is chosen to be on the order of about twice the thickness of the key member, there being a plurality of said axial grooves formed in the outer periphery of the valve plunger which is in sliding contact with the guide and circumferentially spaced apart to define the variable pressure passage.

* * * * *